(12) United States Patent
Lin et al.

(10) Patent No.: US 11,391,997 B2
(45) Date of Patent: Jul. 19, 2022

(54) DISPLAY PANEL AND DISPLAY DEVICE

(71) Applicant: Shenzhen China Star Optoelectronics Semiconductor Display Technology Co., Ltd., Guangdong (CN)

(72) Inventors: Munan Lin, Shenzhen (CN); Bangyin Peng, Shenzhen (CN); Ilgon Kim, Shenzhen (CN)

(73) Assignee: SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 154 days.

(21) Appl. No.: 16/770,503

(22) PCT Filed: Apr. 28, 2020

(86) PCT No.: PCT/CN2020/087631
§ 371 (c)(1),
(2) Date: Jun. 5, 2020

(87) PCT Pub. No.: WO2021/203496
PCT Pub. Date: Oct. 14, 2021

(65) Prior Publication Data
US 2022/0035196 A1    Feb. 3, 2022

(30) Foreign Application Priority Data

Apr. 8, 2020   (CN) .......................... 202010269983.4

(51) Int. Cl.
*G02F 1/1339*   (2006.01)
*G02F 1/1362*   (2006.01)

(52) U.S. Cl.
CPC .... *G02F 1/13394* (2013.01); *G02F 1/136222* (2021.01); *G02F 1/136227* (2013.01)

(58) Field of Classification Search
CPC ............... G02F 1/1339; G02F 1/13394; G02F 1/136222; G02F 1/136227
See application file for complete search history.

(56) References Cited

U.S. PATENT DOCUMENTS

2007/0019135 A1   1/2007 Sohn et al.
2015/0346533 A1   12/2015 Park et al.
(Continued)

FOREIGN PATENT DOCUMENTS

CN   202330955 U   7/2012
CN   107490906 A   12/2017
(Continued)

*Primary Examiner* — Angela K Davison
(74) *Attorney, Agent, or Firm* — Kirton McConkie; Evan R. Witt (57) ABSTRACT

A display panel and a display device are provided. The display panel includes a first substrate, a second substrate, and a liquid crystal layer. The first substrate comprises a substrate, an array structure layer, a color resist layer, a pixel electrode layer, and a column spacer layer. The column spacer layer includes at least one spacer column, the color resist layer includes at least one supporting color resist block supporting the spacer column, a supporting compensation block is disposed on one side of any of the supporting color resist blocks, the supporting compensation block is disposed on the array structure layer, and the spacer column is disposed on the supporting color resist block and the supporting compensation block.

16 Claims, 6 Drawing Sheets

(56) References Cited

U.S. PATENT DOCUMENTS

2019/0043895 A1    2/2019  Shen et al.
2019/0129265 A1*   5/2019  Sim .................... G02F 1/133707
2019/0235310 A1*   8/2019  Li ...................... G02F 1/133516

FOREIGN PATENT DOCUMENTS

CN    108153042 A    6/2018
KR    20070012084 A  1/2007

* cited by examiner

DISPLAY PANEL AND DISPLAY DEVICE

FIELD OF INVENTION

This disclosure relates to a field of display technology, and more particularly to a display panel and a display device.

BACKGROUND OF INVENTION

A liquid crystal display (LCD) is a widely used flat panel display, which is mainly realized by modulating the intensity of a light field of a backlight through a liquid crystal switch.

Technical Problems

At present, for a display panel with a high refresh rate and high resolution, such as the display panel with frequency of 120 Hz and 8K pixels, with the improvement of the resolution of the display panel, a pixel size of the display panel is reduced, and a size of a corresponding color resist is also reduced accordingly. As a result, in a structure of the display panel, such as a color resist layer on the array (CF on Array, COA) type display panel, a transversal size (width) of the color resist does not meet the support requirements for a photo spacer (PS, or column spacer), such that in the conventional structure, a bottom of the column spacer is exposed outside the color resist, the column spacer falls off in a following reliability test, and the columnar spacer cannot provide a desirable support force for upper and lower substrates in the display panel. The surface pressure in the display panel is affected.

SUMMARY OF INVENTION

Technical Solutions

The disclosure provides a display panel and a display device for solving the drawbacks that the color resist in the conventional display panel cannot provide the desirable support force for the column spacer and affect the overall surface pressure of the display panel.

In order to solve the above-mentioned drawback, the disclosure provides a technical solution as follow.

The disclosure provides a display panel. The display panel comprises a first substrate, a second substrate disposed opposite the first substrate, and a liquid crystal layer disposed between the first substrate and the second substrate.

The first substrate comprises a substrate, an array structure layer disposed on the substrate, a color resist layer disposed on the array structure layer, and a pixel electrode layer and a column spacer layer disposed on the color resist layer.

The column spacer layer comprises at least one spacer column, the color resist layer comprises at least one supporting color resist block supporting the spacer column, a supporting compensation block is disposed at one side of any of the supporting color resist blocks, the supporting compensation block is disposed on the array structure layer, and the spacer column is disposed on the supporting color resist block and the supporting compensation block.

In the display panel of the disclosure, a first opening is disposed at one side of any of the supporting color resist blocks, the supporting compensation block is disposed at one side of the supporting color resist block away from the first opening, a side of the spacer column away from the supporting compensation block extends to the first opening, and an orthographic projection of the spacer column in a direction perpendicular to the color resist layer at least partially overlaps the first opening.

In the display panel of the disclosure, a first through hole is disposed in the first opening for electrically connecting the pixel electrode layer and the array structure layer, and the orthographic projection of the spacer column in a direction perpendicular to the color resist layer is adjacent to an orthographic projection of the first through hole in a direction perpendicular to the color resist layer.

In the display panel of the disclosure, at least one first groove is disposed at one lateral edge of a bottom of the first opening close to the spacer column, and the first groove comprises an overlapping area with the first opening.

In the display panel of the disclosure, an orthographic projection of the first groove on the first opening is positioned inside an area of the first opening.

In the display panel of the disclosure, the orthographic projection of the first groove on the first opening is positioned in the first opening and an area of the color resist layer adjacent to the first opening.

In the display panel of the disclosure, a width of the spacer column at the first opening is greater than a width of the first opening.

In the display panel of the disclosure, a shape of a lateral cross section of the supporting compensation block comprises one of a trapezoid shape, a rectangle shape, or a semicircle shape, the lateral cross section is parallel to a plane corresponding to the color resist layer.

In the display panel of the disclosure, the orthographic projection of the spacer column in the direction perpendicular to the color resist layer overlaps an orthographic projection of the supporting compensation block in a direction perpendicular to the color resist layer.

In the display panel of the disclosure, a material of the supporting compensation block is the same as a material of the supporting color resist block, and the supporting compensation block and the supporting color resist block are an integrally formed structure.

The disclosure further provides a display device. The display device comprises a backlight module and a display panel disposed on the backlight module.

The display panel comprises a first substrate, a second substrate disposed opposite the first substrate, and a liquid crystal layer disposed between the first substrate and the second substrate.

The first substrate comprises a substrate, an array structure layer disposed on the substrate, a color resist layer disposed on the array structure layer, and a pixel electrode layer and a column spacer layer disposed on the color resist layer.

The column spacer layer comprises at least one spacer column, the color resist layer comprises at least one supporting color resist block supporting the spacer column, a supporting compensation block is disposed at one side of any of the supporting color resist blocks, the supporting compensation block is disposed on the array structure layer, and the spacer column is disposed on the supporting color resist block and the supporting compensation block.

In the display device of the disclosure, a first opening is disposed at one side of any of the supporting color resist blocks, the supporting compensation block is disposed at one side of the supporting color resist block away from the first opening, a side of the spacer column away from the supporting compensation block extends to the first opening, and an orthographic projection of the spacer column in a direction perpendicular to the color resist layer at least partially overlaps the first opening.

In the display device of the disclosure, a first through hole is disposed in the first opening for electrically connecting the pixel electrode layer and the array structure layer, and the orthographic projection of the spacer column in a direction perpendicular to the color resist layer is adjacent to an orthographic projection of the first through hole in a direction perpendicular to the color resist layer.

In the display device of the disclosure, at least one first groove is disposed at one lateral edge of a bottom of the first opening close to the spacer column, and the first groove comprises an overlapping area with the first opening.

In the display device of the disclosure, an orthographic projection of the first groove on the first opening is positioned inside an area of the first opening.

In the display device of the disclosure, the orthographic projection of the first groove on the first opening is positioned in the first opening and an area of the color resist layer adjacent to the first opening.

In the display device of the disclosure, a width of the spacer column at the first opening is greater than a width of the first opening.

In the display device of the disclosure, a shape of a lateral cross section of the supporting compensation block comprises one of a trapezoid shape, a rectangle shape, or a semicircle shape, the lateral cross section is parallel to a plane corresponding to the color resist layer.

In the display panel of the disclosure, the orthographic projection of the spacer column in the direction perpendicular to the color resist layer overlaps an orthographic projection of the supporting compensation block in a direction perpendicular to the color resist layer.

In the display panel of the disclosure, a material of the supporting compensation block is the same as a material of the supporting color resist block, and the supporting compensation block and the supporting color resist block are an integrally formed structure.

Advantageous Effects

Advantageous effects of the disclosure are as follows. In this disclosure, by disposing the supporting compensation block on one side of the supporting color resist block for supporting the spacer column, and extending the spacer column disposed on the supporting color resist block to the supporting compensation block, a support area wherein the spacer column is positioned is increased, which provides a desirable support for the spacer column. Besides, the support performance of the spacer column is stabilized, and the surface pressure effect in the display panel is improved.

DESCRIPTION OF DRAWINGS

In order to more clearly illustrate the embodiments of the disclosure or the technical solutions in the prior art, the following briefly introduces the accompanying drawings used in the embodiments. Obviously, the drawings in the following description merely show some of the embodiments of the disclosure. As regards one of ordinary skill in the art, other drawings can be obtained in accordance with these accompanying drawings without making creative efforts.

DETAILED DESCRIPTION OF PREFERRED EMBODIMENTS

This description of the exemplary embodiments is intended to be read in connection with the accompanying drawings, which are to be considered part of the entire written description. In the description, terms such as "upper", "lower", "front", "back", "left", "right", "inside", "outside", and "side", as well as derivatives thereof, should be construed to refer to the orientation as then described or as shown in the drawing under discussion. These terms are for convenience of description and do not require that the apparatus be constructed or operated in a particular orientation, and do not limit the scope of the disclosure. Referring to the drawings of the disclosure, similar components are labeled with the same number.

In the description of this disclosure, it should be understood that the terms "center", "longitudinal", "transverse", "length", "width", "thickness", "upper", "lower", "front", "back", "left", "right", "vertical", "horizontal", "top", "bottom", "inner", "outer", "clockwise", "counterclockwise" etc. for indicating orientation or positional relationship are based on the orientation or positional relationship shown in the drawings. The above-mentioned terms are only for the convenience of describing the disclosure and for simplifying the description, rather than indicating or implying that the device or element referred to must have a specific orientation, be constructed and operated in a specific orientation. Therefore, it cannot be understood as a limitation to this disclosure. In addition, the terms "first" and "second" are used for description purposes only, and cannot be understood as indicating or implying relative importance or implicitly indicating the disclosed number of technical features. Thus, features defined as "first" and "second" may explicitly or implicitly include one or more of the features. In the description of this disclosure, the meaning of "plurality" is two or more, unless otherwise specifically limited.

In the description of this disclosure, it should be noted that, unless otherwise clearly specified and limited, the terms "installation", "connecting", and "connection" should be understood in a broad sense. For example, it can be fixed connection or detachable connection, or integrally connection, or mechanical connection, or electrical connection, or communicate with each other, it also can be directly connected, or can be indirectly connected through an intermediary, or it can be the connection between two elements or the interaction of two elements. For those of ordinary skill in the art, the specific meaning of the above terms in the disclosure can be understood according to specific situations.

In this disclosure, unless otherwise clearly specified and defined, the first feature "above" or "below" the second feature may include the direct contact of the first and second features, or may include the first and second features not directly contact but through another feature between them. Moreover, the first feature is "on", "above" and "upper" the second feature includes that the first feature is directly above and obliquely above the second feature, or simply means that a horizontal height of the first feature is higher than a horizontal height of the second feature. The first feature is "down", "below" and "lower" the second feature includes that the first feature is directly below and obliquely below the second feature, or simply means that a horizontal height of the first feature is lower than a horizontal height of the second feature.

The following disclosure provides many different embodiments or examples for implementing different structures of the disclosure. In order to simplify the description of the disclosure, the elements and configuration of specific examples are described below. Of course, the embodiments are only examples, and are not to limit this disclosure. In addition, the disclosure can repeat reference numerals and/or reference letters in different examples for the purpose of simplicity and clarity, which in itself does not indicate the relationship between the various disclosed embodiments and/or configurations. In addition, the disclosure provides examples of various specific processes and materials, but one having ordinary skill in the art can understand that other processes and/or the use of other materials can be applied.

The technical solution of the disclosure will now be described in combination with specific embodiments.

Referring to FIG. 1 to FIG. 6, the disclosure provides a display panel 1, which comprises a first substrate 10, a second substrate 20 disposed opposite the first substrate 10, and a liquid crystal layer 30 disposed between the first substrate 10 and the second substrate 20.

The first substrate 10 comprises a substrate 11, an array structure layer 12 disposed on the substrate 11, a color resist layer 13 disposed on the array structure layer 12, and a pixel electrode layer (not shown) and a column spacer layer 14 disposed on the color resist layer 13.

The column spacer layer 14 comprises at least one spacer column 141, the color resist layer 13 comprises at least one supporting color resist block 131 supporting the spacer column 141, and a supporting compensation block 1311 is disposed on one side of any of the supporting color resist blocks 131. The supporting compensation block 1311 is disposed on the array structure layer 12, and the spacer column 141 is disposed on the supporting color resist block 131 and the supporting compensation block 1311.

It can be understood that at present, for a display panel with a high refresh rate and a high resolution, as the resolution of the display panel 1 increases, a pixel size of the display panel decreases, and a size of a corresponding color resist also decreases accordingly. As a result, in a structure of the display panel, such as a color resist layer on the array (CF on Array, COA) type display panel, a transversal size (width) of the color resist does not meet the support requirements for a column spacer, such that in the conventional structure, a bottom of the column spacer is exposed outside the color resist, the column spacer falls off in a following reliability test, and the columnar spacer cannot provide a desirable support force for upper and lower substrates in the display panel. The surface pressure in the display panel is affected. In this disclosure, by disposing the supporting compensation block 1311 on one side of the supporting color resist block 131, and extending the spacer column 141 disposed on the supporting color resist block 131 to the supporting compensation block 1311, a support area wherein the spacer column 141 is positioned is increased, which provides a desirable support for the spacer column 141. Besides, the support performance of the spacer column 141 is stabilized, and the surface pressure effect in the display panel 1 is improved.

Figure 2:
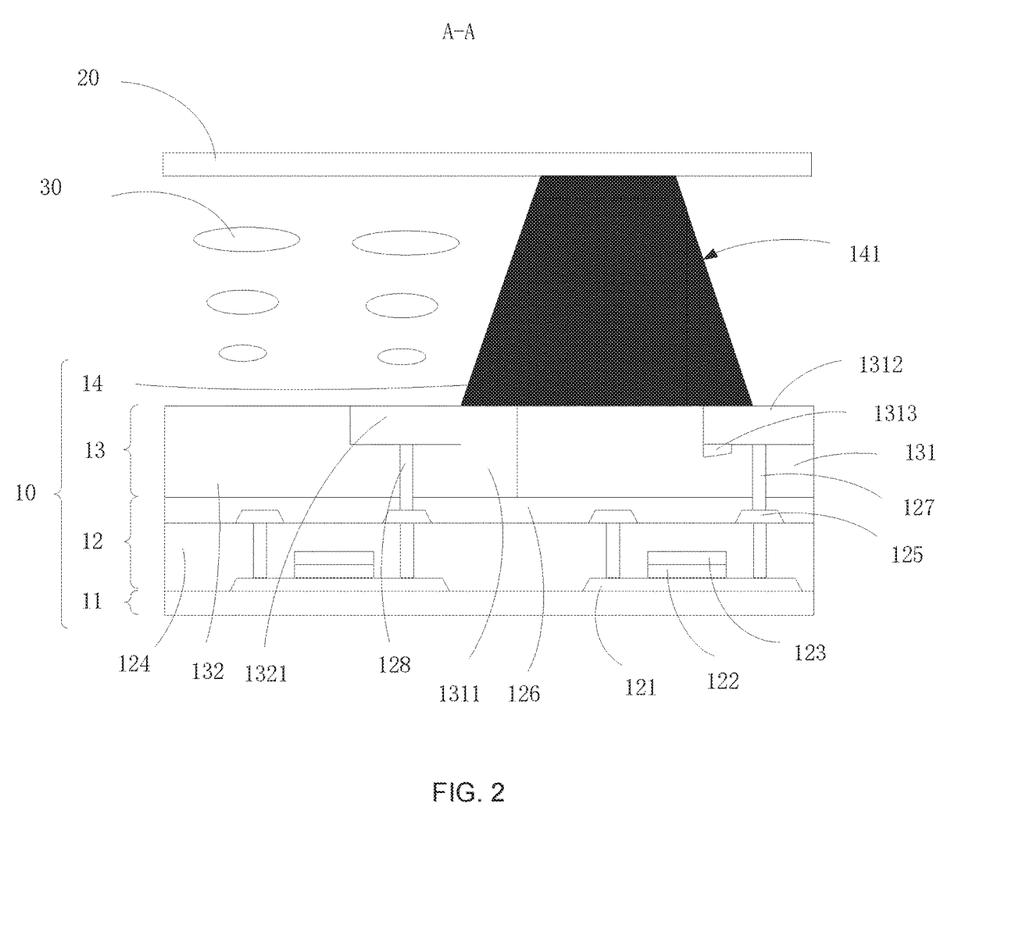
FIG. 2 is a cross-sectional structural schematic diagram of the display panel as shown in FIG. 1 along A-A'.

As shown in FIG. 2, obviously, the first substrate 10 is a COA type substrate, and the substrate 11 is one of a rigid substrate or a flexible substrate. When the substrate 11 is a rigid substrate, the substrate is made of glass, quartz, or the like. When the substrate is a flexible substrate, the substrate is made of a material such as polyimide. In an LCD display panel, a structure of the substrate 11 is generally set as a rigid substrate, which will not be described in detail here.

The array structure layer 12 includes a plurality of thin film transistors. The thin film transistor can be an etching barrier type, a back channel etching type, a top gate thin film transistor type, or other structures, which is not specifically limited. For example, the thin film transistor of the top gate thin film transistor type can include an active layer 121 disposed on the substrate 11, a gate insulating layer 122 on the active layer 121, a gate layer 123 disposed on the gate insulating layer 122, an interlayer insulating layer 124 disposed on the gate layer 123, a source drain layer 125 disposed on the interlayer insulating layer 123, and a passivation layer 126 disposed on the source drain layer 125.

Figure 1:
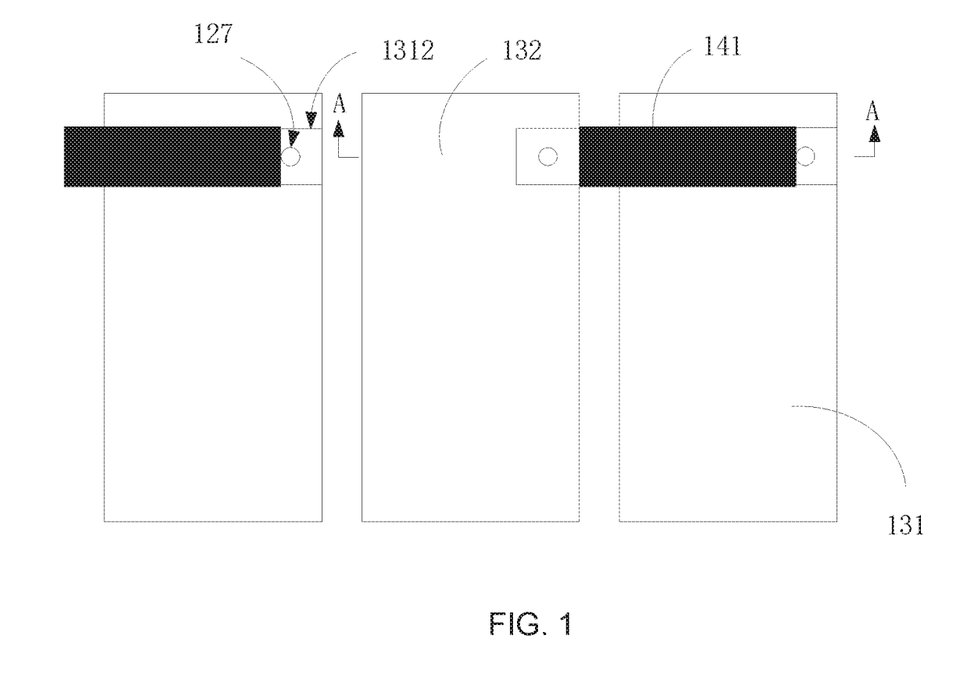
FIG. 1 is a schematic diagram of a first top view structure of a display panel of the disclosure.
Figure 3:
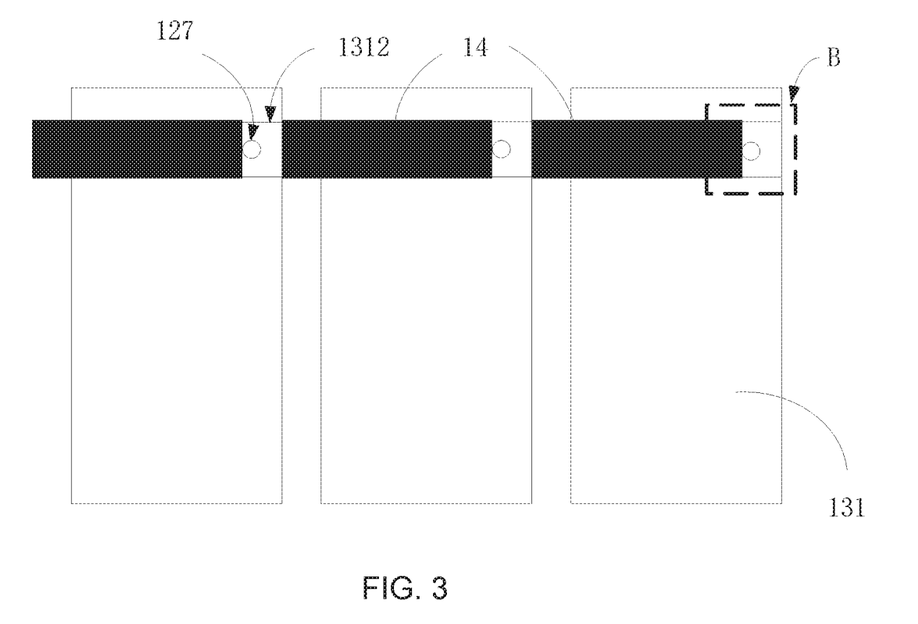
FIG. 3 is a schematic diagram of a second top view structure of a display panel of the disclosure.

It should be noted that, as shown in FIG. 1 and FIG. 3, the color resist layer 13 includes a plurality of color resist blocks arranged in an array. A color resist block is the color resist block 131 which support the spacer column 141 or a conventional color resist block 132 that does not support the spacer column 141. Moreover, it can be understood that the number of the supporting color resist blocks 131 is the same as the number of the spacer column 141, and the supporting color resist blocks 131 and the spacer column 141 correspond with each other one by one. Each of the supporting color blocks 131 comprises a spacer column 141. Specifically, in practical application, according to actual requirements of products, in each of the color resist layers 13, all of color resist blocks may be the supporting color resist blocks 131, or a part of the color resist blocks may be the supporting color resist blocks 131. Specifically, when the number of the supporting color resist blocks 131 is greater than or equal to 2, as shown in FIG. 1, the arrangement between any of two of the supporting color resist blocks 131 can be disposed at intervals. That is, there is at least one conventional color resist block 132 disposed between the two supporting color resist blocks 131. Alternatively, as shown in FIG. 2, the two supporting color resist blocks 131 are arranged adjacent to each other, and the specific arrangement form is not limited here. Obviously, as shown in FIG. 1 and FIG. 3, two color resist blocks disposed on both sides of one supporting color resist block 131 can be either two supporting color resist blocks 131, or one supporting color resist block 131 and one conventional color resist block 132. In this embodiment, One supporting color resist block 131 is adjacent to color resisting blocks disposed on both sides of the supporting color resist block 131, so as to maximize an area of the supporting color resist block 131, which provides a large support area for the spacer column 141, and also makes the structure of the display panel 1 stable.

In an embodiment, as shown in FIG. 1 to FIG. 4, a first opening 1312 is disposed on one side of any of the supporting color resist blocks 131, and the supporting compensation block 1311 is disposed on one side of the supporting color resist block 131 which is far away from the first opening 1312. The spacer column 141 which is far away from the supporting compensation block 1311 extends to the first opening 1312, and an orthographic projection of the spacer column 141 in a direction perpendicular to the color resist layer 13 at least partially overlaps the first opening 1312. Obviously, in the structure of the COA type display panel 1, since the color resist layer 13 has a certain thickness, before a first through hole that electrically connects the pixel electrode layer with the array structure layer 12 is formed, the first opening 1312 needs to be formed in the supporting color resist block 131. It can be understood that by extending a side of the spacer column 141 away from the supporting compensation block 1311 to the first opening 1312, and making the orthographic projection of the spacer column 141 in the direction perpendicular to the color resist layer 13 at least partially overlaps the first opening 1312, the spacer column 141 partially extends above the first opening 1312, thereby further increasing a cross-sectional area of the spacer column 141, which is advantageous to improve the overall supporting effect of the spacer column 141 for the display panel 1.

As mentioned above, in this embodiment, as shown in FIG. 2, the spacer column 141 is positioned between the supporting compensation block 1311 and the first opening 1312, and both sides of the spacer column 141 are respectively extended to the supporting compensation block 1311 and the first opening 1312. Meanwhile, the first opening 1312 is disposed on a side of the supporting color resist block 131 away from the supporting compensation block 1311 for maximizing a distance between the first opening 1312 and the supporting compensation block 1311. That is, a lateral distance of the supporting color resist block 131 is maximized. In addition, an area corresponding to the first opening 1312 and the supporting compensation block 1311 does not affect a light transmission area of the first substrate 10, so as to maximize a cross-sectional area of the spacer column 141 and a support area of the supporting color resist block 131 to the spacer 141, thereby reducing the risk of the shedding of the column spacer 141 in a following reliability test, and improving the yield of the display panel 1.

In an embodiment, as shown in FIG. 2, a first through hole 127 is disposed in the first opening 1312 for electrically connecting the pixel electrode layer with the array structure layer 12, and the orthographic projection of the spacer column 141 in a direction perpendicular to the color resist layer 13 is adjacent to an orthographic projection of the first through hole 127 in a direction perpendicular to the color resist layer 13. It can be understood that the display panel 1 also includes a first through hole 127 through the color resist layer 13 and the passivation layer 126, and the pixel electrode layer is electrically connected with the source/drain electrode of the array structure layer 12 through the first through hole 127. In the manufacturing process of the COA type display panel, after the preparation of the first substrate 10 is completed, materials such as polyimide need to be used for aligning on the first substrate 10. In order to prevent that an area extending from a side of the spacer column 141 away from the supporting compensation block 1311 to a upper part of the first opening 1312 is too large, therefore, the spacer column 141 covers the first through hole 127 in a direction perpendicular to the color resist layer 13, a drainage effect of the first through hole 127 and the first opening 1312 on polyimide in the subsequent alignment process is affected, obviously, the orthogonal projection of the spacer column 141 in the direction perpendicular to the color resist layer 13 cannot overlap the orthogonal projection of the first via 127 in the direction perpendicular to the color resist layer 13. That is, a distance between the orthographic projection of the spacer column 141 in the direction perpendicular to the color resist layer 13 and the orthographic projection of the first through hole 127 in the direction perpendicular to the color resist layer 13 is greater than or equal to 0. In this embodiment, a manner of the orthographic projection of the spacer column 141 in the direction perpendicular to the color resist layer 13 adjacent to the orthographic projection of the first via 127 in the direction perpendicular to the color resist layer 13 is used. That is to say, the side of the spacer column 141 away from the supporting compensation block 1311 extends to an edge of the first through hole 127 in the first opening 1312. Moreover, the distance between the orthographic projection of the spacer column 141 in the direction perpendicular to the color resist layer 13 and the orthographic projection of the first through hole 127 in the direction perpendicular to the color resist layer 13 is equal to 0. On the basis of ensuring the subsequent alignment effect, the cross section of the spacer column 141 is maximized increased.

In an embodiment, at least one first groove 1313 is disposed at one lateral edge of a bottom of the first opening 1312 close to the spacer column 141, and the first groove 1313 comprises an overlapping area with the first opening 1312. It can be understood that, in the manufacturing process of the COA type display panel 1, after the manufacturing of the color resist layer 13 is completed and the first opening 1312 is formed on the supporting color resist block 131, the spacer column 141 will be disposed on the supporting color resist block 131. However, due to the fluidity of a spacer column material, the spacer column material flows into the first opening 1312, which makes a distance between the first through hole 127 and a boundary of the first opening 1312 too small, or even affects the first through hole 127. Besides, in order to maximize the cross section of the spacer column 141 and improve the support effect of the spacer column 141 on the overall display panel 1, the side of the spacer column 141 away from the supporting compensation block 1311 extends to the first opening 1312, and the orthographic projection of the spacer column 141 in the direction perpendicular to the color resist layer 13 at least partially overlaps the first opening 1312. As the size of the spacer column 141 is increased, more spacer column material flows into the first opening 1312 when manufacturing the spacer column 141, thereby affecting the overall structure and size design of the first opening 1312 and the first through hole 127. Therefore, as shown in FIG. 2, the color resist layer 13 further includes at least a first groove 1313 disposed at one lateral edge of a bottom of the first opening 1312 close to the spacer column 141 so that the spacer column material flowing into the first opening 1312 further flows into the first groove 1313. It is ensured that the overall structure and size design of the first opening 1312 and the first through hole 127 are not affected. Moreover, in specific embodiments, on the basis that the spacer column material that flows into the first opening 1312 can be accommodated, the number of the first grooves 1313 is not limited herein.

Figure 5:
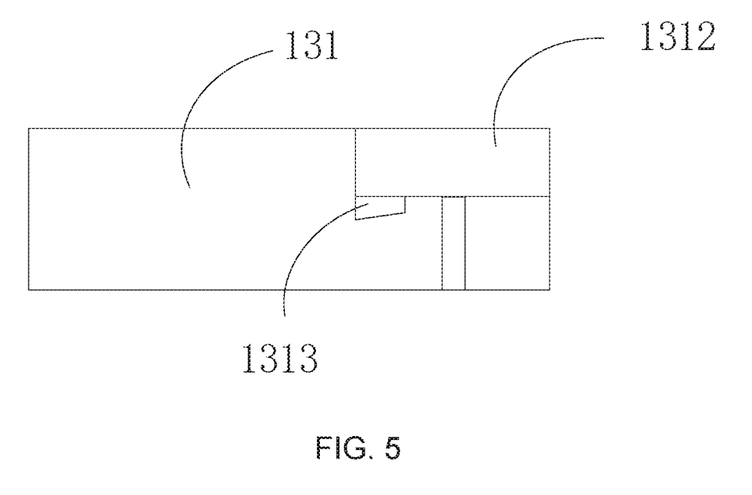
FIG. 5 structural schematic diagram of a first relative position of a first opening and a first groove in a display panel of the disclosure.
Figure 6:
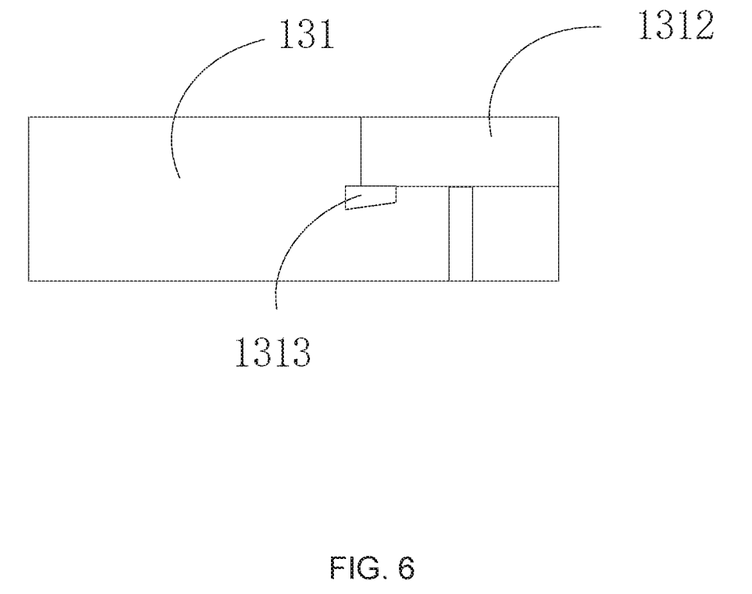
FIG. 6 structural schematic diagram of a second relative position of the first opening and the first groove in a display panel of the disclosure.

As mentioned above, the first groove 1313 comprises an overlapping area with the first opening 1312, as shown in FIG. 5. The orthographic projection of the first groove 1313 on the first opening 1312 is positioned in an area of the first opening 1312, as shown in FIG. 6. It may be that the orthographic projection of the first groove 1313 on the first opening 1312 is positioned in the first opening 1312 and a color resist area adjacent to the first opening 1312. Due to a certain height difference between an edge area of the first opening 1312 and the supporting color resist block 131, the spacer column material flows into the first opening 1312 due to the fluidity of the spacer column material when the spacer column 141 is fabricated. It makes that a bottom surface of the first opening 1312 is flattened, the distance between the first through hole 127 and the boundary of the first opening 1312 is ensured, and the impact on the first through hole 127 during subsequent alignment is prevented. Specifically, the bottom of the first groove 1313 is inclined. For example, one side of the bottom of the first groove 1313 away from the supporting compensation block 1311 is higher than one side of the bottom of the first groove 1313 close to the supporting compensation block 1311, or in other progressive forms with a height difference. After the spacer column material flows into the first groove 1313 due to the height difference, the drainage effect is achieved by inclining the bottom of the first groove 1313.

Figure 4:
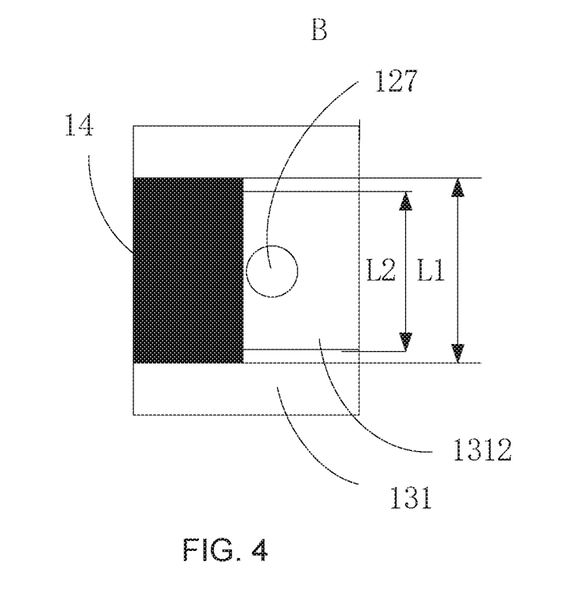
FIG. 4 is a partially enlarged structural schematic diagram at B of FIG. 3.

In an embodiment, as shown in FIG. 4, a width L1 of the spacer column 141 at the first opening 1312 is greater than a width L2 of the first opening 1312. A width direction of the spacer column 141 at the first opening 1312 is perpendicular to a connection line between the supporting compensation block 1311 and the first opening 1312. In this embodiment, after extending the two sides of the spacer column 141 to the supporting compensation block 1311 and the first opening 1312 respectively for increasing a length of the spacer column 141, the width of the spacer column 141 at the first opening 1312 is greater than the width of the first opening 1312, and the width of the spacer column 141 at the first opening 1312 is increased. In specific embodiment, the width of the spacer column 141 at the first opening 1312 is greater than the width of the first opening 1312 or less than the width of the first opening 1312. In this embodiment, the width of the spacer column 141 at the first opening 1312 is greater than the width of the first opening 1312, so that the spacer column 141 is supported by the supporting color resist block 131 at the three sides of the first opening 1312, which provides desirable stability. It can be understood that the width of the spacer column 141 at the first opening 1312 is limited to the width at a position of the first opening 1312 in the spacer column 141. Of course, a specific width of a portion of the spacer column 141 far away from the first opening 1312 can be set according to actual needs, which is not limited.

In an embodiment, a shape of a lateral cross section of the supporting compensation block 1311 comprises one of a trapezoid shape, a rectangle shape, or a semicircle shape, the lateral cross section is parallel to a plane corresponding to the color resist layer 13. It can be understood that the shape of the lateral cross section of the supporting compensation block 1311 can be selected according to actual needs. Specifically, after a fixed shape of the lateral cross section of the supporting compensation block 1311 is formed, a longest side of the fixed shape is selected as a side close to the supporting compensation block 1311 to maximize a contact area between the supporting compensation block 1311 and the supporting color resist block 131. Moreover, a height of the supporting compensation block 1311 is the same as a height of the supporting color resist block 131, so as to improve the stability of the overall position of the spacer column 141 after extending from the supporting color resist block 131 to the supporting compensation block 1311, and also to facilitate the subsequent manufacturing process of the spacer column 141.

In an embodiment, a material of the supporting compensation block 1311 is the same as a material of the supporting color resist block 131, and the supporting compensation block and the supporting color resist block are an integrally formed structure. Obviously, the material of the supporting compensation block 1311 can be the same color resist material as the supporting color resist block 131, and can be integrally formed by the same process, so that the supporting compensation block 1311 and the supporting color resist block 131 have better integrity and a more stable structure. In addition, it does not affect the overall manufacturing process of the display panel 1. The difference is only that a shape of a photomask during the manufacturing process of the color resist layer 13 is changed, which makes the display panel in this disclosure has good applicability in actual manufacturing process.

In one embodiment, as shown in FIG. 1 and FIG. 3, the orthographic projection of the spacer column 141 in the direction perpendicular to the color resist layer 13 overlaps an orthographic projection of the supporting compensation block 1311 in a direction perpendicular to the color resist layer 13. That is to say, a portion of the spacer column 141 positioned on the supporting compensation block 1311 completely covers a surface of the supporting compensation block 1311. It is made full use of the area of the supporting compensation block 1311. Besides, this structure does not affect the overall manufacturing process of the display panel 1. The difference is only that it changes the shape of the photomask in the manufacturing process of the column spacer layer 14, which is more practical and easy to promote.

Figure 7:
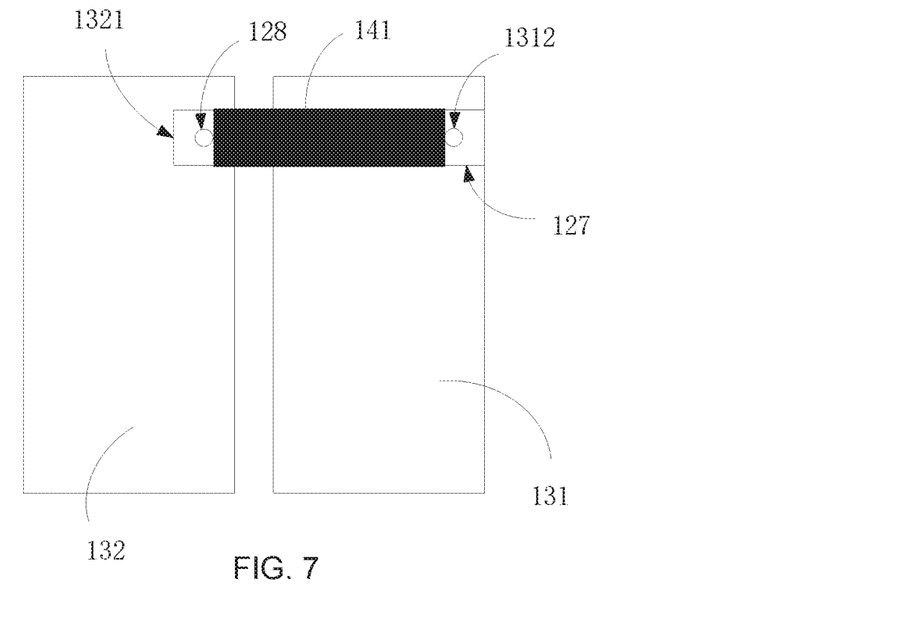
FIG. 7 is a schematic diagram of a third top view structure of a display panel of the disclosure.
Figure 8:
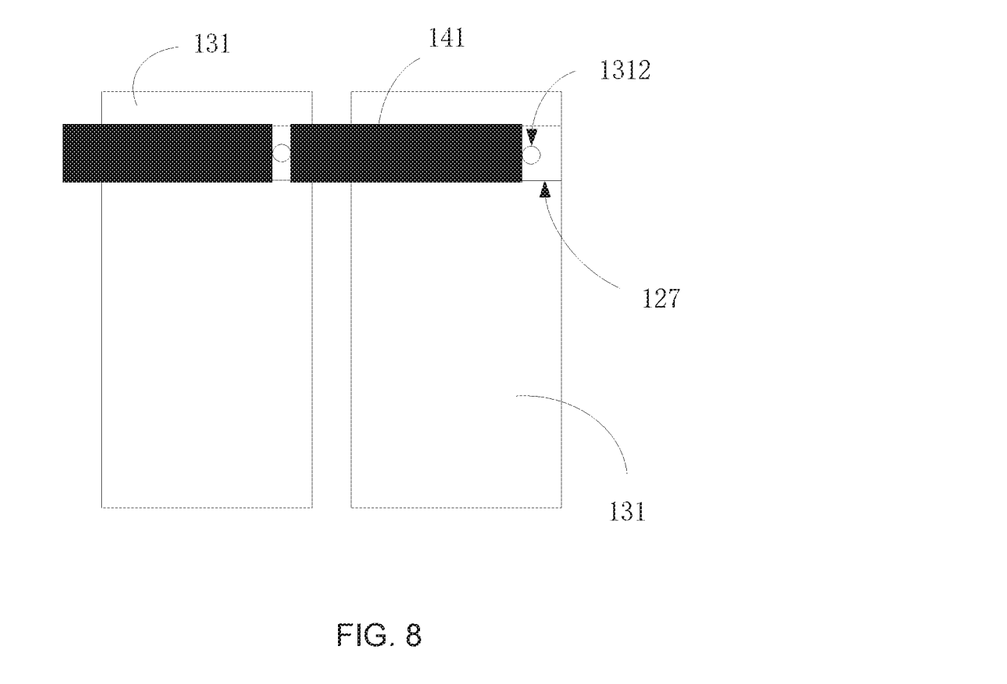
FIG. 8 is a schematic diagram of a fourth top view structure of a display panel of the disclosure.

In one embodiment, as shown in FIG. 7, when two color resist blocks on both sides of one supporting color resist block 131 are the supporting color resist block 131 and the conventional color resist block 132, respectively, a portion of the spacer column 141 positioned on the supporting color resist 131 further extends onto the conventional color resist block 132. In this embodiment, a second opening 1321 is disposed in the conventional color resist block 132, the second opening 1321 is disposed adjacent to the supporting color resist block 131, and a portion of the spacer column 141 disposed on the supporting color resist block 131 further extends above the second opening 1321, and the orthographic projection of the spacer column 141 in the direction perpendicular to the color resist layer 13 at least partially overlaps the second opening 1321. Specifically, a second through hole 128 is disposed in the second opening 1321 to electrically connect the pixel electrode layer and the array structure layer 12, and the spacer column 141 extends to the second through hole 128 through the supporting color resist block 131. That is, the orthographic projection of the spacer column 141 in a direction perpendicular to the color resist layer 13 is adjacent or tangent to an orthographic projection of the second through hole 128 in the direction perpendicular to the color resist layer 13, thereby further increasing the cross sectional area of the spacer column 141. It is advantage to improve the whole supporting effect of the spacer column 141 on the display panel 1. In addition, as shown in FIG. 8, when both the color resist blocks on both sides of one supporting color resist block 131 are the supporting color resist blocks 131, a portion of the spacer column 141 disposed on one of the supporting color resist block 131 extends to another supporting color resist block 131, and the specific structure will not be repeated here.

Figure 9:
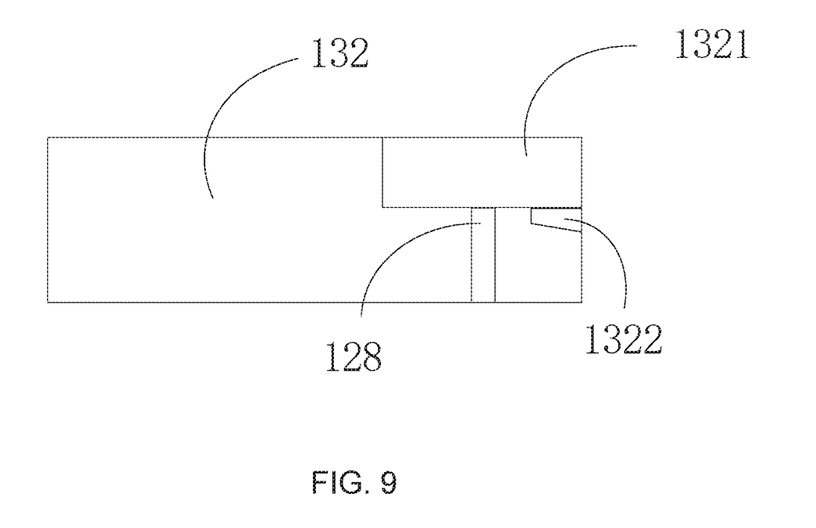
FIG. 9 is a structural diagram of a relative position of a second opening and a second groove in the display panel of the disclosure.

As shown in FIG. 9, in this embodiment, the portion of the spacer column 141 disposed on the supporting color resisting block 131 further extends above the second opening 1321. At least one second groove 1322 is disposed on a bottom of the second opening 1321 close to a side of the supporting color resist block 131, and the second groove 1322 comprises an overlapping area with the second opening 1321. The second groove 1322 is used for drainage of the spacer column material when the spacer column 141 is manufactured. Specifically, the spacer column material flows into the second opening 1321 due to the fluidity of the spacer column material when the spacer column 141 is manufactured. The arrangement of the second groove 1322 makes a color resist material flowing into the second opening 1321 to flow into the second groove 1322, so that a bottom surface of the second opening 1321 is flattened, a distance between the second through hole 128 and the boundary of the second opening 1321 is ensured, and the impact on the second through hole 128 during subsequent alignment is prevented.

Figure 10:
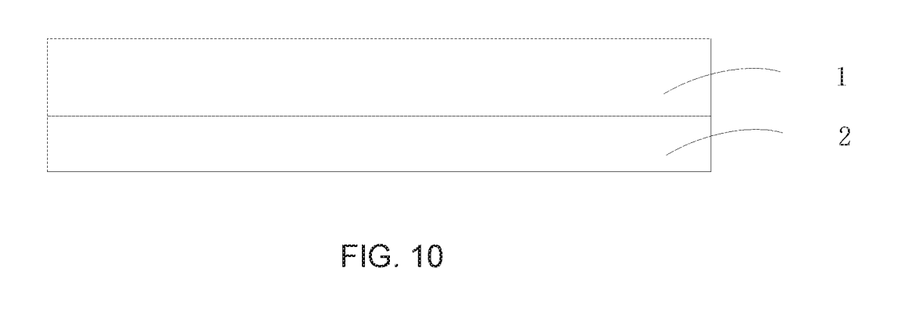
FIG. 10 is a structural diagram of a display device of the disclosure.

The disclosure further provides a display device. As shown in FIG. 10, the display device includes a backlight module 2 and a display panel 1 according to any one of the preceding embodiments of the backlight module. The working principle of the display device is the same as or similar to that of the display panel 1 described above, and will not be repeated here.

As mentioned above the disclosure provides a display panel and a display device. The display panel includes a first substrate 10, a second substrate 20 disposed opposite the first substrate 10, and a liquid crystal layer 30 disposed between the first substrate 10 and the second substrate 20. The first substrate 10 comprises a substrate 11, an array structure layer 12 disposed on the substrate 11, a color resist layer 13 disposed on the array structure layer 12, and a pixel electrode layer and a column spacer layer 14 disposed on the color resist layer 13. The column spacer layer 14 comprises at least one spacer column 141, the color resist layer 13 comprises at least one supporting color resist block 131 supporting the spacer column 141. A supporting compensation block 1311 is disposed on one side of any of the supporting color resist blocks 131, the supporting compensation block 1311 is disposed on the array structure layer 12, and the spacer column 141 is disposed on the supporting color resist block 131 and the supporting compensation block 1311. In this disclosure, by disposing the supporting compensation block 1311 on one side of the supporting color resist block 131 for supporting the spacer column 141, and extending the spacer column 141 disposed on the supporting color resist block 131 to the supporting compensation block 1311, a support area wherein the spacer column 141 is positioned is increased, which provides a desirable support for the spacer column 141. Besides, the support performance of the spacer column 141 is stabilized, and the surface pressure effect in the display panel 1 is improved.

This disclosure has been described with preferred embodiments thereof, and it is understood that many changes and modifications to the described embodiment can be carried out without departing from the scope and the spirit of the invention that is intended to be limited only by the appended claims.

What is claimed is:

1. A display panel, comprising: a first substrate, a second substrate disposed opposite the first substrate, and a liquid crystal layer disposed between the first substrate and the second substrate;
   wherein the first substrate comprises a substrate, an array structure layer disposed on the substrate, a color resist layer disposed on the array structure layer, and a pixel electrode layer and a column spacer layer disposed on the color resist layer;
   wherein the column spacer layer comprises at least one spacer column, the color resist layer comprises at least one supporting color resist block supporting the spacer column, a supporting compensation block is disposed on one side of any of the supporting color resist blocks, the supporting compensation block is disposed on the array structure layer, and the spacer column is disposed on the supporting color resist block and the supporting compensation block;
   wherein a first opening is disposed at one side of any of the supporting color resist blocks, the supporting compensation block is disposed at one side of the supporting color resist block away from the first opening, a side of the spacer column away from the supporting compensation block extends to the first opening, and an orthographic projection of the spacer column in a direction perpendicular to the color resist layer at least partially overlaps with the first opening; wherein at least one first groove is disposed at one lateral edge of a bottom of the first opening close to the spacer column, and the first groove comprises an overlapping area with the first opening.

2. The display panel according to claim 1, wherein a first through hole is disposed in the first opening for electrically connecting the pixel electrode layer and the array structure layer, and the orthographic projection of the spacer column in a direction perpendicular to the color resist layer is adjacent to an orthographic projection of the first through hole in a direction perpendicular to the color resist layer.

3. The display panel according to claim 1, wherein an orthographic projection of the first groove on the first opening is positioned inside an area of the first opening.

4. The display panel according to claim 1, wherein the orthographic projection of the first groove on the first opening is positioned in the first opening and a color resist area adjacent to the first opening.

5. The display panel according to claim 1, wherein a width of the spacer column at the first opening is greater than a width of the first opening.

6. The display panel according to claim 1, wherein a shape of a lateral cross section of the supporting compensation block comprises one of a trapezoid shape, a rectangle shape, or a semicircle shape, the lateral cross section is parallel to a plane corresponding to the color resist layer.

7. The display panel according to claim 1, wherein the orthographic projection of the spacer column in the direction perpendicular to the color resist layer overlaps an orthographic projection of the supporting compensation block in a direction perpendicular to the color resist layer.

8. The display panel according to claim 1, wherein a material of the supporting compensation block is the same as a material of the supporting color resist block, and the supporting compensation block and the supporting color resist block are an integrally formed structure.

9. A display device, comprising a backlight module and a display panel disposed on the backlight module;
   wherein the display panel comprises a first substrate, a second substrate disposed opposite the first substrate, and a liquid crystal layer disposed between the first substrate and the second substrate;
   wherein the first substrate comprises a substrate, an array structure layer disposed on the substrate, a color resist layer disposed on the array structure layer, and a pixel electrode layer and a column spacer layer disposed on the color resist layer;
   wherein the column spacer layer comprises at least one spacer column, the color resist layer comprises at least one supporting color resist block supporting the spacer column, a supporting compensation block is disposed at one side of any of the supporting color resist blocks, the supporting compensation block is disposed on the array structure layer, and the spacer column is disposed on the supporting color resist block and the supporting compensation block;
wherein a first opening is disposed at one side of any of the supporting color resist blocks, the supporting compensation block is disposed at one side of the supporting color resist block away from the first opening, a side of the spacer column away from the supporting compensation block extends to the first opening, and an orthographic projection of the spacer column in a direction perpendicular to the color resist layer at least partially overlaps with the first opening; wherein at least one first groove is disposed at one lateral edge of a bottom of the first opening close to the spacer column, and the first groove comprises an overlapping area with the first opening.

10. The display device according to claim 9, wherein a first through hole is disposed in the first opening for electrically connecting the pixel electrode layer and the array structure layer, and the orthographic projection of the spacer column in a direction perpendicular to the color resist layer is adjacent to a orthographic projection of the first through hole in a direction perpendicular to the color resist layer.

11. The display device according to claim 9, wherein a orthographic projection of the first groove on the first opening is positioned inside an area of the first opening.

12. The display device according to claim 9, wherein the orthographic projection of the first groove on the first opening is positioned in the first opening and an area of the color resist layer adjacent to the first opening.

13. The display device according to claim 9, wherein a width of the spacer column at the first opening is greater than a width of the first opening.

14. The display device according to claim 9, wherein a shape of a lateral cross section of the supporting compensation block comprises one of a trapezoid shape, a rectangle shape, or a semicircle shape, the lateral cross section is parallel to a plane corresponding to the color resist layer.

15. The display device according to claim 9, wherein the orthographic projection of the spacer column in the direction perpendicular to the color resist layer overlaps a orthographic projection of the supporting compensation block in a direction perpendicular to the color resist layer.

16. The display device according to claim 9, wherein a material of the supporting compensation block is the same as a material of the supporting color resist block, and the supporting compensation block and the supporting color resist block are an integrally formed structure.

* * * * *